March 17, 1959  A. W. ALBERTINE ET AL  2,877,970
VIBRATION DAMPING CONNECTION

Filed Dec. 21, 1955  2 Sheets-Sheet 1

INVENTORS
ALBERT W. ALBERTINE
MATHA M. MILLER AND
RAYMOND C. ZALLER

BY Edwin Coate
ATTORNEY

March 17, 1959  A. W. ALBERTINE ET AL  2,877,970
VIBRATION DAMPING CONNECTION

Filed Dec. 21, 1955  2 Sheets-Sheet 2

INVENTORS
ALBERT W. ALBERTINE
MATHA M. MILLER AND
RAYMOND C. ZALLER

BY Edwin Coates
-ATTORNEY-

United States Patent Office 2,877,970
Patented Mar. 17, 1959

2,877,970

VIBRATION DAMPING CONNECTION

Albert William Albertine, Santa Monica, Matha M. Miller, Los Angeles, and Raymond C. Zaller, Santa Monica, Calif., assignors to Douglas Aircraft Company, Inc., Santa Monica, Calif.

Application December 21, 1955, Serial No. 554,465

4 Claims. (Cl. 244—119)

This invention relates to enclosures defined by vibratile walls which tend to render the enclosure noisy. Specific examples of such enclosures include the cabins of aircraft and more particularly the small sub-enclosures portioned off within such cabins and especially cloakrooms, toilets, crew-station enclosures and the like. However, as will become apparent, the concepts and advantages of the invention are by no means confined to these named environments, being employable with any partitioned spaces in which the partition abuts a vibratile wall.

In such enclosures the outer wall includes the skin of the aircraft's fuselage. This skin vibrates inwardly and outwardly, at a relatively low frequency, under the influence of pressurized fuselage pressure-expansions and contractions and natural, or aerodynamic, fuselage vibrations. These low frequency vibrations produce noises which, even in such confined spaces as those of cloakrooms, toilets, etc., are not too objectionable and since these movements relieve stresses, they are not detrimental to any such degree as calls for obviation thereof.

However, the skin-vibrations induced by engine-vibration or noise or by aerodynamic buffeting, are of sonic frequency or intensity and do produce in these small confined compartments a noise that is not only a source of irritation to the occupants thereof but, if endured for certain lengths of time, eventually cause fatigue in most persons.

Means are provided by subject invention whereby the skin's low-frequency vibrations are still allowed to occur in order, among other things, to relieve the stresses, as mentioned; the same means, however, being so constituted and arranged as to, concurrently or severally, as desired, substantially completely attenuate the obnoxious high-frequency vibrations of the skin in this environment thereby obviating the chief objection of most passengers and crew-members to occupying such small compartments for any appreciable length of time. These low-frequency vibrations of the skin occur, usually, only at take-off and landing and are due to pressurization fluctuations and to the fuselage bending moments, whereas the high-frequency vibrations occur continuously in flight and are caused by sonic-vibrations of the engine and by aerodynamic buffeting, etc.

More especially, in one of the concrete forms of the invention, a pressurized aircraft cabin has a partitioned compartment in which the outer wall is the metallic fuselage skin and the thwartship partitions are rectangularly contiguous to the inner surface of the skin. The partitions defining the forward and aft walls of the small, confined compartment are mounted to the skin in a novel manner by means including a dual-nature anchoring material, such as a silicone rubber in a permanent paste state, the arrangement permitting the partitions and skin to move, thwartship, relatively to each other only at very low-frequency vibrations of the skin (due to pressurization changes at take off and landing and to fuselage stresses then occurring). The paste remains semi-solid and yieldable at these slow shearing-motion ranges and hence enables stress-relieving sliding of the partitions.

However, this anchoring-material is also of such a nature that, while then "passing" low-frequency vibrations, it will not then, or at any other time, permit the high-frequency vibrations to "pass." Instead, to the latter shearing movements of high speeds, it in effect becomes densified and dynamically substantially rigid, thereby preventing the high-frequenuy vibrating movements of the skin at its juncture therewith or suppressing local high-speed skin vibrations, thereby immobilizing the skin in these confined spaces to an extent adequate to reduce the engine-noise, buffeting noises, etc., below objectionable levels.

This exemplificatory embodiment of the present concepts is illustrated in the accompanying drawings and is described hereinafter in conjunction with these drawings mainly in order to render this disclosure of the inventive advances more concrete.

Figure 1:
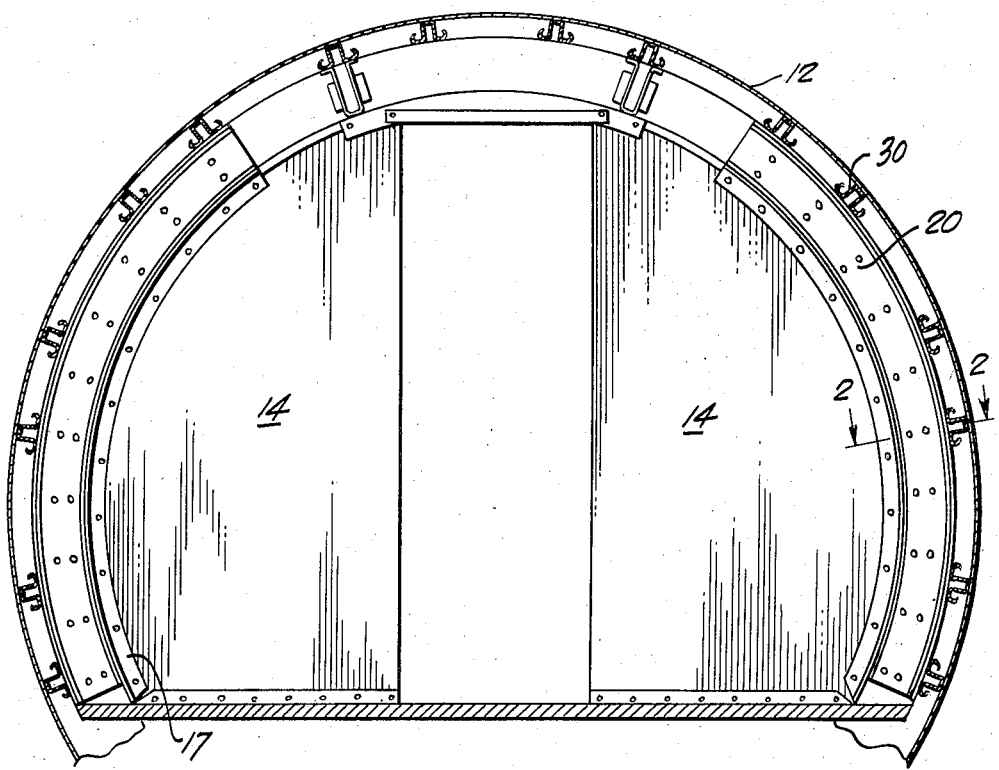
Figure 1 is a fragmentary cross-sectional view, partly in elevation, of an aircraft cabin that includes compartments defined by the fuselage skin and partitions that embody the invention.
Figure 2:
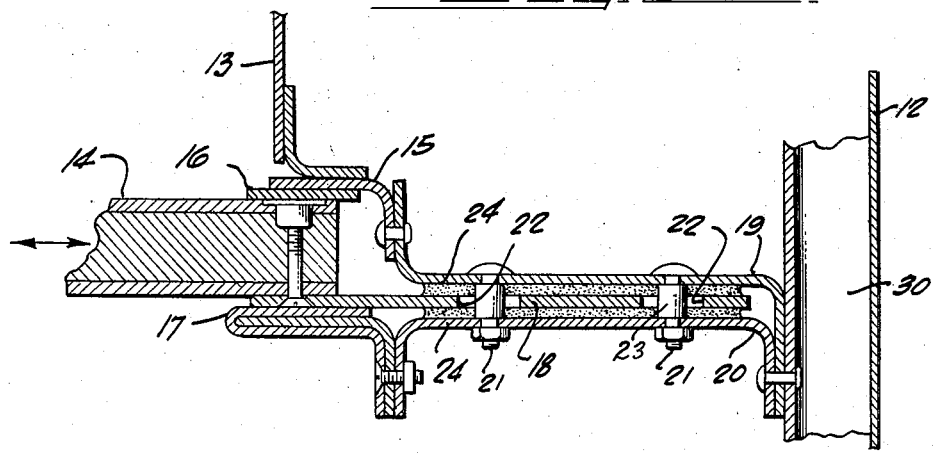
Figure 2 is a fragmentary section on line 2—2 of Figure 1.

As appears from Figure 1, the cabin is outwardly bounded by a cabin wall that includes a metallic skin 12 and a liner 13, both skins, and consequently the wall, being vibratile. Partitions 14 define the thwartship faces, forward or aft, of a pair of small compartments spaced oppositely to each other across the aisle of the cabin.

The peripheral edges of the partitions stop short of the fuselage skin and are slidingly positioned and guided in rigid structural elements 15 and 17, element 15 being shown as a rigid angle-piece or extrusion and guide-element 17 being depicted as a doubler seizing an angle-piece. However, such configuration of the guides is merely coincidental to this particular airplane and it is clear that any other suitable specific conformation of the guides may be employed instead.

To the one face of the peripheral margin of the partition there is facewise attached, as by means of bolts one of which is shown, a guided-fin 18 which is curved to conform coextensively to the curve of the curved peripheral edge of the partition. A wear plate, or spacer, 16, is interposed between guide-member 15 and the adjacent edge of the partition. The partition is thus adapted for thwartship sliding movement in guides 15 and 17, to relieve stresses; and it becomes dynamically rigid and immobilized, by means later described, so as to damp, attenuate or immobilize the skin's high frequency vibrations.

Figure 3:
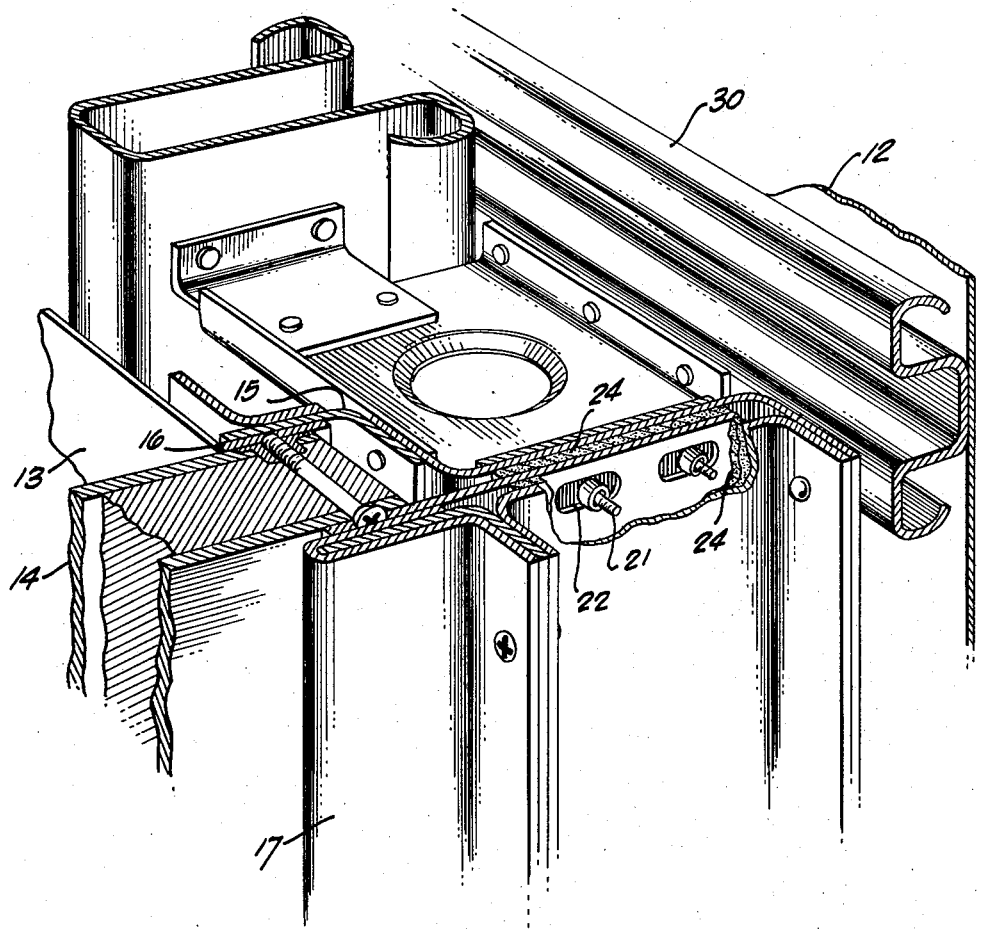
Figure 3 is a perspective view of the construction shown in Figure 2 with certain adjacent structural elements of the fuselage also shown.

A pair of fore-and-aft spaced fin guides 19 and 20 are provided for the outer portion, or peripheral margin of the fin, fin-guide 19 here taking a sinuous form in cross-section for fuselage structural reasons apparent from Figure 3 and fin-guide 20 being of channel section for the same reasons. The outer ends of 19 and 20 are overlapped and united to the stringers 30 as shown, the opposite ends being flared and united to the partition-guides, as indicated.

The fin 18 is slidably united to the guides 19 and 20 by means of sleeved bolts 21, slots 22 in the fin receiving the sleeved bolt shanks, the sleeves 23 serving to maintain the proper distance between members 19 and 20.

Disposed in facewise coextensiveness with the inner faces of guides 19 and 20 and with the faces of the fin or blade 18 is a permanently paste-like, semi-solid or viscous fin-anchoring, or relative motion-controlling material 24, of a novel dual-nature as to its ability to differentially resist high-speed and low-speed shearing movements of the fin and skin as to each other. One suitable such material for the present purposes is the conventional silicone rubber paste now on the market, or its equivalent. This substance, when receiving "slow," low-frequency vibrations from the skin, due to pressurization fluctuations, ordinary fuselage "working," etc., always permits relative movements between the skin and the fin, as for stress-relieving purposes, since no obnoxious noise is produced thereby. It can thus be designated a low-frequency pass acoustic filter.

The paste 24, however, at the high-speed shearing movements applied to it by the high-frequency vibrations of the skin and induced by engine sonic-vibrations, buffeting, etc., resists almost rigidly the movement of the fin and in turn immobilizes, or damps, the skin at these points. Under action of the rapidly-moving, high-frequency acoustic pressure waves, it acts almost as a rigid solid, and makes use of the rigidity of the partition to resist the vibratile movement of the skin. It then does internal work that dissipates it, or transforms the kinetic energy of these high-frequency vibrations into a certain amount of internal friction and heat. To these higher frequencies, therefore, the arrangement, while passing the lower frequencies, acts as a high-frequency "no-pass," serving as a dynamically substantially rigid connection that suppresses these vibrations without transmitting them. Thus, in the regions where such partitions are abutted against the skin, all objectionable noises are screened out from the small, confined compartments, yet stress-relieving motions are not interfered with.

Although certain elements have had certain specific shapes and compositions ascribed thereto in order to render the description more concrete, it is to be understood that such specificity in no wise limits the essence of the invention thereto, and the scope of the invention is solely as defined in the sub-joined claims.

We claim:

1. In an aircraft including a fuselage having a metallic skin vibratile in response to pressure variations, fuselage working, and the like to produce low frequency pressure waves, and vibratile in response to engine vibrations and the like to produce high frequency acoustic pressure waves: a partition extending transversely in said fuselage and having a peripheral edge portion; mounting means for said edge portion attached to said vibratile metallic skin and having receiving means for cooperation with said edge portion; said receiving means and said edge portion normally being movable with respect to each other; and a normally paste-like vibration-filtering silicone rubber paste interposed between said edge portion and said receiving means; said paste being yieldable to low frequency movement but being substantially rigidly resistant to high frequency movement; whereby said edge portion and said receiving means may move relatively to each other at low frequency but become relatively immobile at high frequency so that said partition reinforces said metallic skin and inhibits the high frequency vibration thereof.

2. A construction as claimed in claim 1, in which said peripheral edge portion is a plate-like fin and said receiving means constitutes a channel formation to slidingly receive said fin, and said silicone rubber paste is interposed in shear-receiving position between said fin and said channel formation.

3. A construction as claimed in claim 1 and, in addition thereto, fastening means passing through said edge portion and said receiving means and retaining them in assembled but relatively movable relation.

4. In an aircraft including a fuselage having a metallic skin vibratile in response to pressure variations, fuselage working, and the like to produce low frequency pressure waves, and vibratile in response to engine vibrations and the like to produce high frequency acoustic pressure waves: a partition extending transversely in said fuselage and having a peripheral edge portion; mounting means for said edge portion attached to said vibratile metallic skin and having receiving means in the form of a channel to slidingly receive said edge portion; fastening means passing through said channel and said edge portion to retain them in their sliding relation; and a normally paste-like vibration-filtering silicone rubber paste interposed between said edge portion and said channel and subjected to shearing action by the relative movement of said members; said paste being yieldable to low frequency movement but being substantially rigidly resistant to high frequency movement; whereby said edge portion and said receiving means may move relatively to each other at low frequency but become relatively immobile at high frequency so that said partition reinforces said metallic skin and inhibits the high frequency vibration thereof.

References Cited in the file of this patent

UNITED STATES PATENTS

| | | |
|---|---|---|
| 2,111,326 | Norris | Mar. 15, 1938 |
| 2,140,672 | Gray et al. | Dec. 20, 1938 |
| 2,329,133 | Peed | Sept. 7, 1943 |
| 2,333,289 | Bohnsack | Nov. 2, 1943 |

FOREIGN PATENTS

| | | |
|---|---|---|
| 307,747 | Germany | Dec. 13, 1919 |